July 9, 1935. H. E. MILLER Re. 19,639
GUY WIRE PROTECTOR
Original Filed Dec. 26, 1930
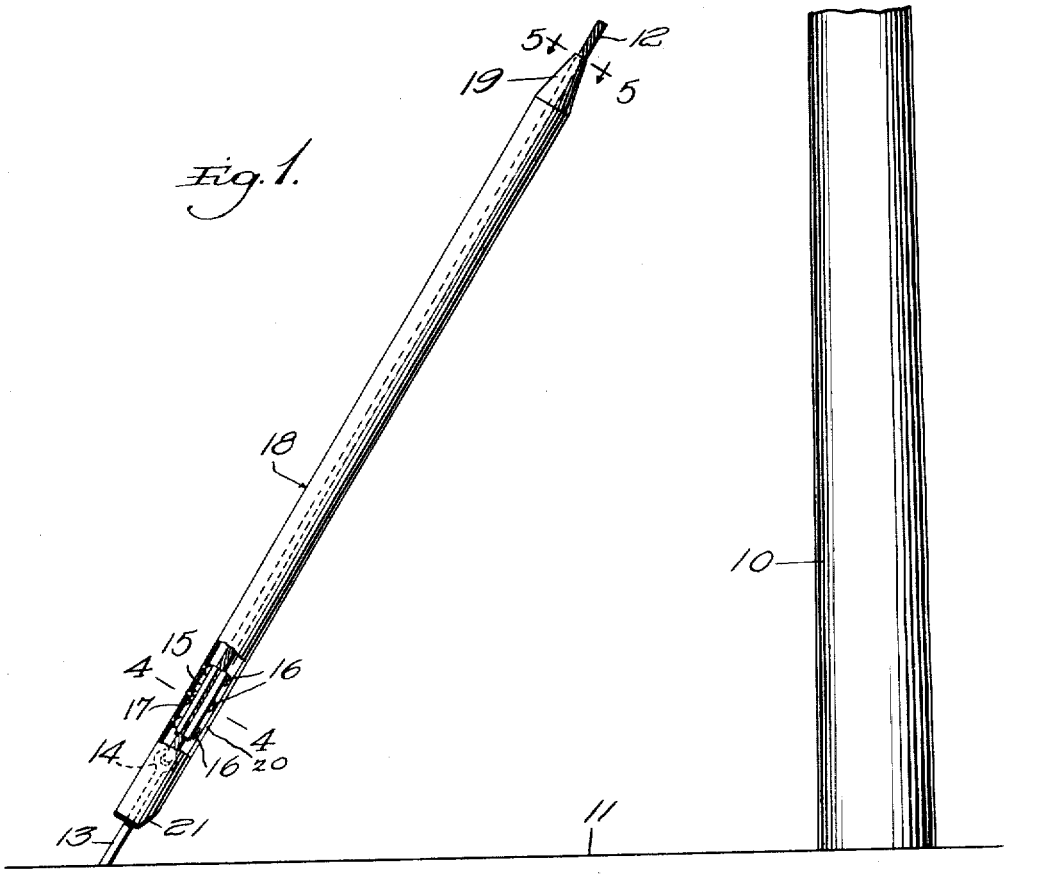
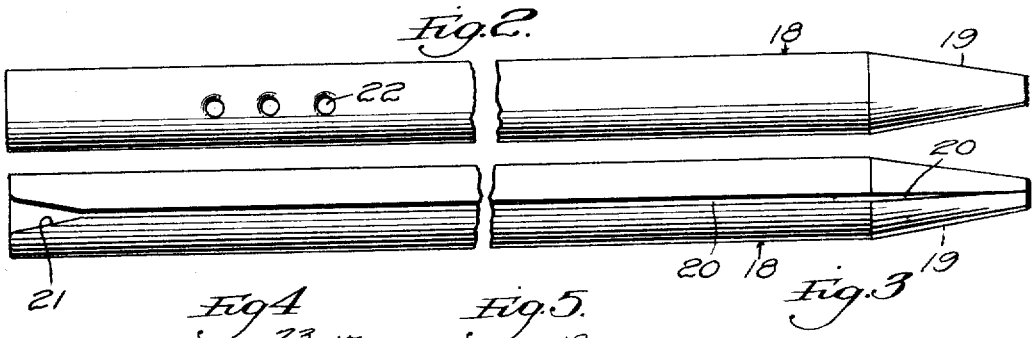
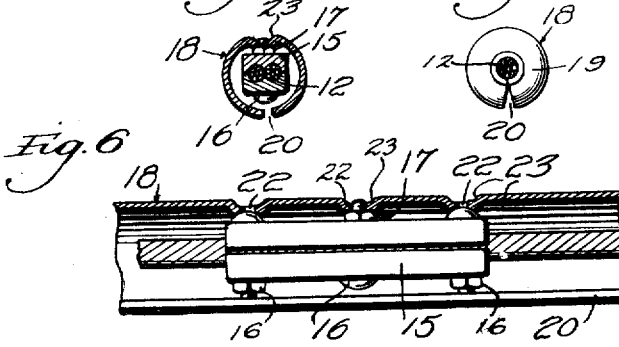
Inventor
HERBERT E. MILLER
C. H. Parker Jr.
Attorney Reissued July 9, 1935 Re. 19,639

UNITED STATES PATENT OFFICE 19,639

GUY WIRE PROTECTOR

Herbert E. Miller, Allentown, Pa., assignor to Utilities Service Company, Inc., Allentown, Pa., a corporation of Pennsylvania Original No. 1,933,818, dated November 7, 1933, Serial No. 504,920, December 26, 1930. Application for reissue October 26, 1934, Serial No. 750,233

29 Claims. (Cl. 189—31.5)

This invention relates to guy wire protectors.

As is well known, it is the common practice to protect the guy wires of telephone poles and the like by surrounding them with elongated protecting coverings usually formed of sheet metal. These devices are satisfactory in operation, but they have two serious disadvantages. In the first place, it is necessary with the usual constructions to provide relatively expensive fastening means for securing the protectors in position, such protectors ordinarily being in the form of U-bolts and similar structures. Moreover, considerable labor is involved in placing the devices in position and securing them to the guy wires, thus adding a considerable item of labor cost to the original cost of manufacture.

An important object of the present invention is to provide a simplified form of guy wire protector which is quite cheap to manufacture, and which may be readily placed in operative position without the use of fastening elements.

A further object is to provide a guy wire protector in the form of a single piece of sheet metal which does not require the use of any fastening elements for securing it in position, but which readily and quickly may be placed in operative position and will remain in such position until removed.

A further object is to provide a guy wire protector formed of a single piece of sheet metal and including means whereby it will be securely fastened in operable position by a portion of the fastening means usually provided for securing the guy wire to the anchor.

Other objects and advantages of the invention will become apparent during the course of the following description.

In the drawing I have shown one embodiment of the invention. In this showing:

Figure 1 is a side elevation showing the device in operation, parts being broken away, Figure 2 is an enlarged face view of the device looking at one side thereof, Figure 3 is a similar view looking at the opposite side of the device, Figure 4 is a section on line 4—4 of Figure 1, Figure 5 is a section on line 5—5 of Figure 1, and, Figure 6 is an enlarged fragmentary longitudinal sectional view through a portion of the device shown in position on a guy wire.

Referring to Figure 1 the numeral 10 designates a telephone or similar pole having its lower end sunk in the ground 11. A guy wire 12 is illustrated as being adapted for supporting the pole, and is of the conventional type employed. An anchor 13 is provided for the guy wire, and has an eye 14 formed at its upper end. The lower end of the guy wire passes through the eye 14 and then doubles back upon the body of the wire, and a two part clamp 15 secures the extremity of the guy wire to the body thereof in accordance with standard practice. The parts of the clamp are secured together by bolts 16. The end bolts 16 preferably have their free ends turned downwardly, while the center bolt 16 preferably has its free end turned upwardly and provided with a nut 17.

The device forming the subject matter of the present invention comprises a guy wire protector indicated as a whole by the numeral 18, and preferably formed of a single piece of sheet metal. The protector is substantially cylindrical throughout the greater portion of its length, as indicated in Figures 3 and 4, the upper end of the protector tapering inwardly as at 19 whereby its extremity substantially snugly engages the guy wire.

The material of the protector has its free edges spaced apart a slight distance as at 20 (see Figures 3, 4 and 5) the space between the free edges of the protector being somewhat less than the diameter of the guy wire. These spaced edges diverge at their lower ends as at 21 to provide what may be termed an entrance opening for the guy wire when the device is being placed in position.

The protector 18 is provided with a plurality of spaced openings 22, as shown in Figures 1, 2, 4 and 5, these openings preferably being arranged diametrically opposite the split side of the protector and at the outer or upper side thereof. Either of the openings 22 is adapted to receive the portion of the central bolt 16 which extends beyond its nut 17. In some instances at least, the diameter of the protector 18 will be greater than the length of the central bolt 16 so as to prevent the extremity of the latter from entering one of the openings 22. Accordingly, the metal surrounding these openings may be stamped or offset inwardly as at 23 in order that the projecting end of the central bolt 16 properly may enter one of the openings 22.

The operation of the device is as follows:

The protector is held outwardly of and above the guy wire and at an angle diverging upwardly therefrom, whereupon the protector is moved downwardly to bring the guy wire into the entrance opening 21. This operation of course takes place wholly above the clamp 15, and by moving the protector inwardly and downwardly with some slight degree of force, the guy wire will be wedged between the spaced edges 20 to spread these edges apart sufficiently to permit the guy wire to enter entirely into the body of the protector.

The protector then may be moved downwardly over the clamp 15 until the projecting end of the central bolt 16 snaps into one of the openings 22, whereupon the device will be fixed in position until intentionally removed. It will be noted that the upper end of the protector substantially snugly fits the guy wire, while the lower end will be held against displacement by the several bolts and the clamp 15. Accordingly, both lateral and longitudinal displacement of the protector will be positively prevented. Rotation of the protector also may be prevented, and accordingly water, snow, etc., will not enter the interior of the protector between the spaced edges 20 thereof.

Accordingly it will be apparent that the entire device comprises a single sheet of material which may be readily and cheaply manufactured, and its use does not require the added expense of separate fastening elements or the labor required for applying such elements. The total cost of the device thus will be materially reduced, and the labor costs of installation will be negligible. It will be noted that the projecting end of the center bolt 16 has been particularly referred to as the securing means for the device, but it will be apparent that either of the bolts may have its free end turned upwardly for this purpose. It also will be apparent that the provision of several of the openings 22 permits the lower end of the protector to be arranged at any desired height above the surrounding ground 11.

Where the claims define a projecting element "normally" carried by the guy wire structure or the like and adapted to be received in the opening in the guy guard, the term "normally" is intended to define the projection as a fixed or permanent part of the guy structure regardless of whether the guard is used with the guy structure. In other words, the guy guard of the present invention contemplates the elimination of separate fastening elements intended to be carried by the linemen whereby the linemen are required to carry nothing but the guy guard and are not required to mount any separate fastening means with respect to the guy structure.

It is to be understood that the form of the invention herewith shown and described is to be taken as a preferred example of the same and that various changes in the shape, size and arrangement of parts may be made without departing from the spirit of the invention or the scope of the subjoined claims.

I claim:

1. A device of the character described comprising a split longitudinal body adapted to surround a guy wire, said body being provided intermediate its ends with an opening of a size and shape adapted to receive a portion of the guy wire clamping device.

2. A device of the character described comprising a body formed of sheet material split longitudinally throughout its length and adapted to surround a guy wire, the upper end of said body being reduced in size to substantially fit the guy wire, the opposite end of said body being provided with an opening spaced from the split in the body.

3. A device of the character described comprising a unitary sheet metal body of substantially cylindrical cross-section throughout the greater portion of its length and split longitudinally to permit the insertion therein of the guy wire, the upper end of said body being tapered whereby the extremity of the body substantially snugly fits the guy wire, said body being provided with an opening spaced from its opposite end and arranged diametrically opposite the split in said body.

4. A device of the character described comprising a sheet metal body split longitudinally throughout its length and adapted to surround a guy wire, the upper end of said body being reduced in size to substantially fit the guy wire, the split in said body diverging at the opposite end thereof to permit the insertion of the guy wire between the split in the body, said body being provided near the last named end thereof with an opening arranged substantially diametrically opposite the split in said body.

5. A device of the character described comprising a unitary sheet metal body substantially circular in cross-section throughout the greater portion of its length, said body being provided with a longitudinal split extending throughout its length and diverging outwardly at its lower end, the upper end of said body being tapered to decrease in size whereby the extremity of the body substantially snugly fits the guy wire, said body being provided with an opening near the bottom thereof and substantially diametrically opposite the split in the body.

6. The combination with a guy wire having an anchor, a two piece clamp for securing the guy wire to the anchor, and fastening elements for the clamp, of a longitudinal body adapted to surround the guy wire and substantially fit the clamp thereof, said body being provided with an opening of a size and shape adapted to receive and fit a projecting portion of one of the fastening elements of the clamp.

7. The combination with a guy wire having an anchor, a two piece clamp for securing the guy wire to the anchor, and fastening elements for the clamp, of a body formed of sheet material split longitudinally throughout its length and adapted to receive the guy wire and to substantially fit the clamp, the upper end of the body being reduced in size to substantially fit the guy wire, said body being provided near its opposite end with an opening adapted to receive a projecting portion of one of the fastening elements of the clamp.

8. The combination with a guy wire having an anchor and a clamping device for securing the guy wire to the anchor, of a longitudinal body adapted to surround the guy wire and to substantially fit the clamping device, said body being provided with an opening of a size and shape adapted to receive and fit a projecting portion of the clamping device.

9. The combination with a guy wire having an anchor and a clamping device for securing the guy wire to the anchor, of a unitary elongated sheet metal body of substantially circular cross-section throughout the greater portion of its length, said body being split throughout its length to permit the insertion therein of the guy wire, said body being adapted to substantially fit the clamping device and being reduced in size at its upper end to substantially snugly fit the guy wire, said body being provided with an opening substantially diametrically opposite the split therein to receive a projecting portion of the clamping device.

10. The combination with a guy wire having an anchor and a clamping device for securing the guy wire to the anchor, of a unitary sheet metal body split longitudinally throughout its length and adapted to surround the guy wire in substantially snug contact with the clamping device, the upper end of said body being reduced in size to substantially fit the guy wire, the split in said body diverging at the lower end thereof to permit the insertion of the guy wire into the body, said body being provided near the last named end thereof with an opening arranged substantially diametrically opposite the split in the body.

11. A device of the character described comprising a longitudinal body adapted to be arranged over a guy wire, said body being provided adjacent one end with an opening of a size and shape adapted to receive and fit a portion of the guy wire clamp.

12. A device of the character described comprising a sheet metal body curved transversely and adapted to be arranged over a guy wire, said body being provided near one end with an opening adapted to receive a portion of the guy wire clamp, the portion of the body adjacent said opening being offset inwardly.

13. The combination with a guy wire having an anchor and a clamp including fastening elements for securing the guy wire to the anchor, of a longitudinal body adapted to be arranged over the guy wire, said body being provided adjacent its lower end with an opening adapted to receive and fit a portion of the guy wire clamp.

14. The combination with a guy wire having an anchor, and a clamp including fastening elements for securing the guy wire to the anchor, of an elongated sheet metal body curved transversely and adapted to be arranged over the guy wire, said body being provided near its lower end with an opening adapted to receive a portion of the guy wire clamp, the portion of the body adjacent said opening being offset inwardly.

15. The combination with guying means including a guy wire, a clamp, anchoring means, and a projecting element normally carried by the guying means, of an elongated body adapted to be arranged over the guy wire, said body being provided with an opening of a size and shape adapted to receive and fit said projecting element, the portion of the body surrounding said opening being offset inwardly from the surrounding portions of said body.

16. A guy guard comprising an elongated body adapted to be arranged over a guy wire, said body being provided with an opening adapted to receive a portion of a guy wire clamp, the portion of the body surrounding said opening being off-set inwardly from the surrounding portions of said body.

17. The combination with a guy wire having anchoring means, and a clamp for securing the guy wire to said anchoring means, of an elongated body adapted to be arranged over the guy wire, said body being provided with an opening adapted to receive a portion of the guy wire clamp, the portion of the body surrounding said opening being off-set inwardly from the surrounding portions of said body.

18. The combination of a guy wire having anchoring means and a clamp including fastening elements for securing the guy wire to said anchoring means, of an elongated body adapted to be arranged over the guy wire, said body being provided with an opening adapted to receive a fastening element of the guy wire clamp, the portion of the body surrounding said opening being offset inwardly from the surrounding portions of said body.

19. A guy wire structure including a guy wire, a plurality of structural elements for clamping and anchoring said guy wire, a projecting element normally carried by one of said structural elements, and an elongated body adapted to be arranged over said guy wire, said body being provided with an opening of a size and shape adapted to receive and fit said projecting element.

20. A guy wire structure including a guy wire, a plurality of structural elements for clamping and anchoring said guy wire, a projecting element normally carried by one of said structural elements, said last named structural element having an enlarged portion adjacent said projecting element, and an elongated body adapted to be arranged over said guy wire, said body being provided with an opening of a size and shape adapted to receive and fit said projecting element, said enlarged portion being adapted to seat against an inner portion of said elongated body.

21. In combination, a guy wire structure including a guy wire and a plurality of structural elements for clamping and anchoring said guy wire, a projecting element carried by the guy wire structure, and an elongated body adapted to be arranged over said guy wire, said body having an inwardly offset socket provided with an opening, said projecting element being carried by said guy wire structure independently of said elongated body and having a portion receivable in the opening and having a portion engageable against a portion of said socket.

22. In combination, a guy wire structure including a guy wire and a plurality of structural elements for clamping and anchoring said guy wire, a projecting element carried by one of said structural elements, and an elongated body adapted to be arranged over said guy wire, said body having an inwardly offset socket provided with an opening, said projecting element being carried by said guy wire structure independently of said elongated body and having a portion receivable in the opening and having a portion engageable against a portion of said socket.

23. In combination, a guy wire structure including a guy wire and a plurality of structural elements for clamping and anchoring said guy wire, an elongated body adapted to be arranged over said guy wire, and a projecting element carried by said guy wire structure independently of said elongated body and having a free end, said body being provided with an opening of a size and shape adapted to receive and fit over the free end of said projecting element.

24. In combination, a guy wire structure including a guy wire and a plurality of structural elements for clamping and anchoring said guy wire, a projecting element carried by one of said structural elements and having a free end, and an elongated body adapted to be arranged over said guy wire, said body having an inwardly off-set socket provided with an opening, said projecting element having a portion engageable against a portion of said socket, the free end of said projecting element being receivable in said opening.

25. In combination, a guy wire structure including a guy wire and a plurality of structural elements for clamping and anchoring said guy wire, a projecting element carried by said guy wire structure, and an elongated body adapted to be arranged over said guy wire, said body having an opening therein and being slidable into operative position to bring said projecting element into engagement with said opening.

26. In combination, a guy wire structure including a guy wire and a plurality of structural elements for clamping and anchoring said guy wire, a projecting element carried by one of said structural elements and having a free end, and an elongated body adapted to be arranged over said guy wire, said body having an opening therein and being longitudinally movable downwardly into operative position to bring the free end of said projecting element into engagement with said opening.

27. In combination, a guy wire structure including a guy wire and a plurality of structural elements for clamping and anchoring said guy wire, a guy guard adapted to be positioned over said guy wire, a depression in said guy guard having an opening therein, and means for attaching said guy guard to said guy wire structure including a portion having a free end extending through said opening, said depression nesting a portion of said attaching means to prevent substantial protrusion of the attaching means above the mean surface of said guy guard.

28. In combination, a guy wire structure including a guy wire and a plurality of structural elements for clamping and anchoring said guy wire, a guy guard adapted to be positioned over said guy wire, a depression in said guy guard having an opening therein, and means, including a portion carried by said guy wire structure independently of said guy guard, for attaching said guy guard to said guy wire structure through said opening, said depression nesting a portion of said attaching means to prevent substantial protrusion of the attaching means above the mean surface of said guy guard.

29. In combination, a guy wire structure including a guy wire and a plurality of structural elements for clamping and anchoring said guy wire, a guy guard adapted to be positioned over said guy wire, a depression in said guy guard having an opening therein, and means, including a member carried by one of said structural elements independently of said guy guard, for attaching said guy guard to said guy wire structure through said opening, said depression nesting a portion of said attaching means to prevent substantial protrusion of the attaching means above the mean surface of said guy guard.

HERBERT E. MILLER.